US010738170B2

(12) United States Patent
Capelot et al.

(10) Patent No.: US 10,738,170 B2
(45) Date of Patent: Aug. 11, 2020

(54) METHOD FOR THE OPEN-MOLD PRODUCTION OF A FIBER-REINFORCED SEMI-CRYSTALLINE POLYAMIDE MATRIX COMPOSITE MATERIAL FROM A PREPOLYMER REACTIVE PRECURSOR COMPOSITION

(71) Applicant: ARKEMA FRANCE, Colombes (FR)

(72) Inventors: Mathieu Capelot, Bernay (FR); Gilles Hochstetter, L'hay les Roses (FR)

(73) Assignee: ARKEMA FRANCE, Colombes (FR)

( * ) Notice: Subject to any disclaimer, the term of this patent is extended or adjusted under 35 U.S.C. 154(b) by 127 days.

(21) Appl. No.: 15/579,968

(22) PCT Filed: Jun. 23, 2016

(86) PCT No.: PCT/FR2016/051536
§ 371 (c)(1),
(2) Date: Dec. 6, 2017

(87) PCT Pub. No.: WO2016/207553
PCT Pub. Date: Dec. 29, 2016

(65) Prior Publication Data
US 2018/0223057 A1 Aug. 9, 2018

(30) Foreign Application Priority Data
Jun. 24, 2015 (FR) .................................. 15 55819

(51) Int. Cl.
*C08J 5/06* (2006.01)
*C08G 69/36* (2006.01)
(Continued)

(52) U.S. Cl.
CPC .................. *C08J 5/06* (2013.01); *B29C 70/52* (2013.01); *C08G 69/265* (2013.01); *C08G 69/36* (2013.01);
(Continued)

(58) Field of Classification Search
CPC ....... Y10T 428/2982; Y10T 428/31725; Y10T 428/31739; B29C 70/443; B29C 70/48;
(Continued)

(56) References Cited

U.S. PATENT DOCUMENTS 4,927,583 A 5/1990 Lottiau et al.
5,422,418 A 6/1995 Maj et al.
(Continued)

FOREIGN PATENT DOCUMENTS

EP 0 261 020 A1 3/1988
EP 0 550 314 A1 7/1993
(Continued)

OTHER PUBLICATIONS

International Search Report for International Application No. PCT/FR2016/051536, dated Oct. 26, 2016.
(Continued)

*Primary Examiner* — Camie S Thompson
(74) *Attorney, Agent, or Firm* — Thomas F. Roland

(57) ABSTRACT

Method for open-mold production of a semi-crystalline thermoplastic polyamide matrix fiber-reinforced composite. The matrix has Tg>80° C. and Tf between 280° C. and 200° C. The matrix is prepared in-situ by molten state bulk polycondensation of a reactive precursor composition including A: a first polyamide prepolymer A1 each carrying two identical functions and a second polyamide prepolymer A2 each carrying two identical functions different from and coreactive with those of A1. The reactive precursors may alternatively include B: a prepolymer carrying (on the same chain) two different functions coreactive with each other. The reactive precursors may alternatively include a precursor composition that is a mixture of (A+B). The method involves successive steps of i) preparing the reactive mixture, ii) continuously coating the fibers by deposition-im-
(Continued)

pregnation with the reactive mixture, iii) in-situ bulk polycondensation in an open heated die, and iv) cooling the composite.

26 Claims, 3 Drawing Sheets

(51) Int. Cl.
*C08L 77/06* (2006.01)
*B29C 70/52* (2006.01)
*C08G 69/26* (2006.01)
*C08J 5/04* (2006.01)

(52) U.S. Cl.
CPC ............... *C08J 5/04* (2013.01); *C08L 77/06* (2013.01); *C08J 2377/06* (2013.01)

(58) Field of Classification Search
CPC ....... B29C 70/52; B29C 70/021; B29C 70/06; C08J 2377/06; C08J 2477/06; C08J 5/06; C08J 5/043; C08J 2377/12; C08J 2377/00; C08J 5/04; C08J 5/24; C08J 5/047; C08J 2300/22; C08J 2300/24; C08G 69/265; C08G 69/36; C08G 69/48; C08L 77/06; C08L 77/00; C08L 2205/025; H05K 2201/0129; B29K 2707/04; B29K 2709/08; B29K 2077/00; B29K 2105/0872; B29B 14/12; B29B 11/16; C09D 117/06

USPC ........ 428/297.4, 402, 474.4, 475.5; 524/494, 524/495, 607; 264/257, 331.19; 427/289.9

See application file for complete search history.

(56) References Cited

U.S. PATENT DOCUMENTS

| 7,927,710 | B2 | 4/2011 | Hewel |
| 8,871,862 | B2 | 10/2014 | Pawlik et al. |
| 9,752,029 | B2 | 9/2017 | Briffaud et al. |
| 2008/0274355 | A1 | 11/2008 | Hewel |
| 2011/0306718 | A1 | 12/2011 | Scherzer et al. |
| 2014/0316063 | A1 | 10/2014 | Hochstetter et al. |
| 2015/0267050 | A1 | 9/2015 | Briffaud et al. |
| 2017/0037204 | A1 | 2/2017 | Briffaud et al. |

FOREIGN PATENT DOCUMENTS

| EP | 1 988 113 | A1 | 11/2008 |
| FR | 2 997 089 | A1 | 4/2014 |
| WO | WO 2011/003973 | A2 | 1/2011 |
| WO | WO 2013/060976 | A1 | 5/2013 |
| WO | WO 2014/064375 | A1 | 5/2014 |
| WO | WO 2015/159015 | A1 | 10/2015 |

OTHER PUBLICATIONS

Koubaa et al., Journal of Reinforced Plastics and Composites, 32(17):1285-94 (2013).

METHOD FOR THE OPEN-MOLD PRODUCTION OF A FIBER-REINFORCED SEMI-CRYSTALLINE POLYAMIDE MATRIX COMPOSITE MATERIAL FROM A PREPOLYMER REACTIVE PRECURSOR COMPOSITION

CROSS-REFERENCE TO RELATED APPLICATIONS

This is the U.S. National Phase of International Application No. PCT/FR2016/051536, filed Jun. 23, 2016, which claims priority to French Application No. 1555819, filed Jun. 24, 2015. The disclosure of each of these applications is incorporated herein by reference in its entirety for all purposes.

FIELD OF THE INVENTION

The present invention relates to a process for preparing a composite material that is reinforced with fibers (also referred to as having "fibrous reinforcement" hereinafter) in an open mold and, in particular, by pultrusion using a specific reactive composition based on prepolymer, said reactive composition being a precursor of the final polymer of the thermoplastic matrix which is made of semicrystalline polyamide having a high glass transition temperature (Tg) of greater than 80° C. and a high melting temperature of less than 280° C., with an ease of impregnating the fibrous substrate and an ease of processing said composite material at controlled temperatures, with no risk of thermal degradation of said thermoplastic matrix polymer. The composite material products derived from this process are used in mechanical applications of the type of structural parts in the motor vehicle field, in the field of road, rail, sea, aeronautical or aerospace transport or in mechanical construction or in the building industry or in parks and leisure or for reinforcements for shields or panels for protection against the impact of projectiles.

BACKGROUND OF THE INVENTION

EP 0 261 020 describes the use of reactive semicrystalline prepolymers based on PA 6, 11 and 12 for the manufacture of a thermoplastic composite by a pultrusion process. The prepolymers of aliphatic structure as described exhibit low Tg values and insufficient mechanical performance qualities under hot conditions.

EP 550 314 describes, among its examples, (nonreactive) copolyamide compositions in a search for melting temperatures (Tm) of greater than 250° C. and limited Tg values, with the majority of the examples cited having an excessively low Tg (<80° C.) or an excessively high Tm (>300° C.).

EP 1 988 113 describes a molding composition based on a 10.T/6.T copolyamide with:
40 to 95 mol % of 10.T
5 to 40 mol % of 6.T.

Polyamides with a high melting temperature of greater than 270° C. are targeted in particular. The examples mentioned and FIG. 1 teach that the melting temperature of these compositions is at least approximately 280° C.

WO 2011/003973 describes compositions comprising from 50 to 95 mol % of a unit based on a linear aliphatic diamine comprising from 9 to 12 carbon atoms and on terephthalic acid and from 5% to 50% of unit combining terephthalic acid with a mixture of 2,2,4- and 2,4,4-trimethylhexanediamine.

US 2011/306718 describes a process for the pultrusion of reactive aliphatic polyamides having low Tg values in combination with chain extenders of polymeric structure bearing several (and many more than 2) anhydride or epoxide functions.

WO 2013/060976 describes a composite material process based on a reactive precursor composition comprising a reactive prepolymer with identical reactive functions and a non-polymeric chain extender bearing functions that react with the functions of said prepolymer via polyaddition.

WO 2014/064375 describes a reactive composition of semicrystalline polyamide prepolymer but in all the examples with a reactive precursor composition, the extending is carried out by an extender of different nature to a polyamide prepolymer.

SUMMARY OF THE INVENTION

The first drawback overcome by the present invention relative to the prior art relates to an improved and more homogeneous impregnation of the fibers of the fibrous reinforcement by the use of a specific precursor composition for the semicrystalline polymer matrix of the targeted composite material and with characteristics of reactive polyamide prepolymers used that allow a low enough viscosity for a good impregnation and adhesion to the fibers with mechanical performance levels that result therefrom which are more uniform and at the same time good reactivity and reaction and crystallization kinetics which are suitable for the process used.

Moreover, the present invention enables a good compromise between the mechanical performance levels and the processability (ease of transformation) at lower temperature. Specifically, the solution of the present invention targets semicrystalline polyamide (PA) compositions that enable easier processing at lower temperatures with a saving regarding the energy balance of the implementation process. In particular, this is enabled by the rapid crystallizability of said semicrystalline polyamide polymer by the specific choice of its composition, and this being while maintaining the mechanical performance levels of said final materials at a high level. More particularly, the reactive precursor compositions used by the process according to the present invention enable a better control of the reaction kinetics, while having a rapid rate of crystallization of the polymer formed and a crystallization temperature and/or rate suitable for the process used.

DETAILED DESCRIPTION OF THE INVENTION

Figure 1:
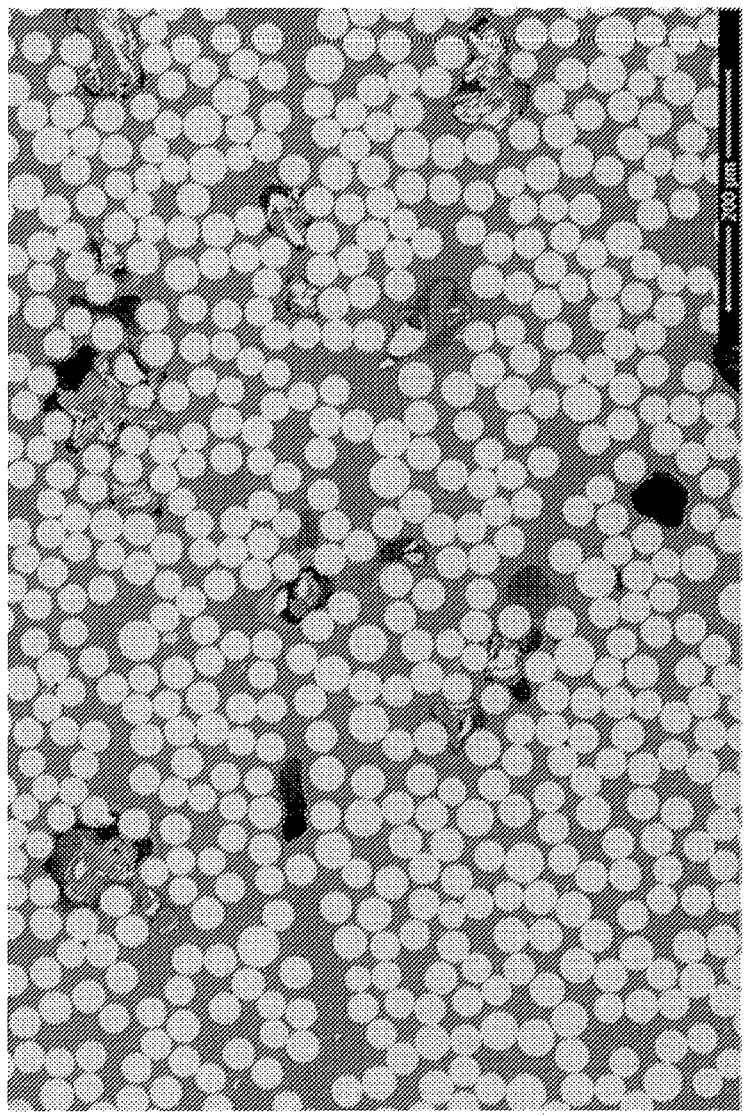
FIG. 1 is a scanning electron micrograph showing the morphology of a comparative example of a composite not made in accordance with the invention.

The choice of a semicrystalline polyamide polymer, as matrix of the composite material of the invention, has the advantage, compared with amorphous polyamides, of significantly improved mechanical performance levels, especially at high temperature, such as creep strength or fatigue strength. In addition, having a melting point above 200° C. has the advantage in the motor vehicle industry of being compatible with treatments by cataphoresis, which a structure of amorphous PA type does not permit. As for the amorphous materials, a Tg of greater than or equal to 90° C. is sought so as to ensure good mechanical properties for the composite over the entire working temperature range, for example up to 90° C. for the wind power industry, up to 100° C. for the motor vehicle industry and up to 120° C. for the aeronautics industry. Conversely, an excessively high melting point, in particular of greater than 280° C., is detrimental as it requires processing the composite at higher temperatures with constraints in terms of molding equipment to be used (and associated heating system) and excessive consumption of energy with, in addition, risks of thermal degradation due to heating at temperatures higher than the melting temperature of said polyamide. Such a thermal degradation has the effect of adversely affecting the properties of the final thermoplastic matrix and therefore of the composite material and final composite part. The crystallinity of said polymer should be as high as possible but with a melting temperature Tm that is not too high (Tm<80° C. and more particularly 270° C.) in order to optimize the mechanical performance levels and the crystallization rate and/or crystallization temperature to be as high as possible. Thus, a selective choice of the composition of said semicrystalline polyamide enables an easier processing for an open mold implementation process, in particular under the pultrusion implementation conditions. Consequently, the subject of the present invention is the processing of novel specific compositions of thermoplastic composite material, in particular based on semicrystalline polyamide, having a good compromise between high mechanical performance levels (mechanical strength), in particular at high temperature, and easy processing. This means that the present invention targets compositions that are easy to process with transformation and processing temperatures that are lower than those for other compositions of the prior art, with a more favorable overall processing energy balance and a higher productivity. More particularly, the solution of the invention with its specific reactive compositions based on semicrystalline reactive polyamide prepolymers allows both controlled reaction kinetics during the impregnation and fast crystallization kinetics. More particularly, in specific cases, depending on the composition and/or specific pultrusion conditions, it enables the production of pultruded profiles with a production rate higher than that of the pultrusion processes for a thermosetting composition or for a monomeric precursor composition. More particularly, the polyamide polymer matrix, while having a high Tg and a limited Tm as already defined, should also have a high crystallization rate. This performance may be characterized by the difference between the melting temperature Tm and the crystallization temperature Tc, Tm−Tc, which does not exceed 60° C., preferably does not exceed 50° C. and more particularly does not exceed 40° C. The mechanical performance levels or mechanical strength at high temperature of the composite may be evaluated by the variation of the mechanical modulus between ambient temperature (23° C.) and 100° C., with maintenance of at least 75% of the mechanical performance levels, in terms of tensile strength, relative to those at ambient temperature (23° C.).

In particular, the reactive precursor compositions based on a reactive prepolymer having identical reactive functions and a nonpolymeric chain extender bearing functions coreactive with those of said prepolymer polymerizing via polyaddition, according to the prior art, have the drawback of resulting in compositions with very rapid reaction kinetics that pose a problem during the impregnation step since, if the polymerization is too rapid, the impregnation is more difficult. The solution of the present invention based on the use of reactive precursor compositions based on reactive prepolymers (i.e. without nonpolymeric extender) as described below, polymerizing via polycondensation, enables slower and controlled kinetics during the impregnation step, thus enabling an easier impregnation in an open mold and in particular under the processing conditions of said composite material by pultrusion.

More particularly, the solution of the present invention based on the use of reactive prepolymers (without nonpolymeric extender) also makes it possible to limit the amount of water released during the (polycondensation) polymerization which facilitates its extraction from the open mold and makes it possible to obtain a composite without defects (microbubbles).

Moreover, the use of prepolymer makes it possible to carry out the polymerization step separately from the impregnation step (with no significant polymerization before this separate polymerization step) since the viscosity of the reactive prepolymer composition is sufficient to maintain the preforming of the composite material at the outlet of a die (after passing through a die) and before said separate polymerization.

Therefore, the object of the invention is to develop a composite material process with a precursor composition based on specific polyamide prepolymer that meets all these requirements.

The first subject of the invention relates to a process for manufacturing a composite material comprising a fibrous reinforcement and a semicrystalline polyamide thermoplastic matrix in an open mold, said process comprising the preparation, in the molten state, of said reactive precursor composition, based on polyamide prepolymer of specific composition, the continuous impregnation of said fibrous reinforcement by said reactive composition, the bulk melt polymerization of said composition, with passage through a die that preforms said composite material and with the possibility of post-polymerization if the polymerization is not complete and finally a cooling of said composite material thus manufactured.

The second subject of the invention relates to said reactive precursor composition as used in said process.

The invention also covers the composite material obtained by said process and an article obtained from said composite material.

The first subject of the invention therefore relates to a process for manufacturing a thermoplastic composite material in an open mold, said material comprising reinforcing fibers (fibrous reinforcement) and a polyamide thermoplastic matrix impregnating said fibers, with said matrix being a semicrystalline polyamide with a glass transition temperature Tg of at least 80° C., preferably of at least 90° C. and more preferentially of at least 100° C. and with a melting temperature Tm less than or equal to 280° C. and greater than 200° C., preferably greater than 220° C., prepared in situ by bulk melt polycondensation polymerization of a reactive precursor composition comprising according to A at least one first polyamide prepolymer A1 bearing two identical functions X (X and X) or Y (Y and Y) and at least one second polyamide prepolymer A2 bearing two identical functions X (X and X) or Y (Y and Y), different from those of A1 and coreactive with respect to those of A1, or of a precursor composition comprising according to B at least one prepolymer bearing (on the same chain) two different functions X and Y coreactive with one another, or of a precursor composition according to a mixture of (A+B): (A1+A2+B) with said functions X and Y being respectively carboxy (X) and amine (Y) and vice versa (Y and X) and in that said process comprises the following successive steps:

i) preparation of the reactive mixture A: (A1+A2) or of the reactive mixture (A+B): (A1+A2+B) by melt blending the components or melting said prepolymer B if it is the only component of said reactive precursor composition, at a temperature greater than that of the melting temperature Tm of the mixture A or of the mixture (A+B) or of the Tm of said prepolymer B if it is the only component of said precursor composition, ii) continuous impregnation of said fibers with said reactive precursor composition, which is, as appropriate, the mixture A or (A+B) or said prepolymer B, in the molten state, preferably with a viscosity of <100 Pa·s, more preferentially <50 Pas, more preferably <10 Pa·s under the impregnation conditions, in an open heated impregnation chamber (2), said impregnation being followed by a preforming at the outlet of the impregnation chamber (2) by means of a die (3), iii) in situ bulk melt polycondensation polymerization in said impregnation chamber (2) and/or outside of said impregnation chamber, in a dedicated zone (4) separate from said impregnation chamber (2) and from a die (3) for preforming said material and with said zone (4) located after the impregnation chamber and said die (3) and with a time and polymerization temperature controlled such that the polymerization temperature is greater than the melting temperature Tm of said thermoplastic matrix polyamide, iv) cooling of said material which may take place in the ambient air, and with said final polyamide of said matrix and said prepolymers A1, A2 or B having the same amide unit composition and said amide units being derived from:
a) a diacid component which is 95 to 100 mol %, preferably 100 mol % of terephthalic structure, with the presence of 0 to 5 mol % of isophthalic diacid, preferably a) being 100% the terephthalic diacid (also known as terephthalic acid),
b) a diamine component composed of:
b1) from 55 to 85 mol %, preferably from 55 to 80 mol % of a $C_9$, $C_{10}$, $C_{11}$ or $C_{12}$ aliphatic linear diamine, and
b2) from 15 to 45 mol %, preferably from 20 to 45 mol % of a diamine different from b1), selected from:
b21) a mono-branched aliphatic diamine with methyl or ethyl substituent and having a difference in chain length relative to the associated diamine b1) of at least two carbons, said diamine b2) preferably being 2-methylpentamethylenediamine (MPMD)
b22) m-xylylenediamine (mXD) or
b23) a $C_4$ to $C_{18}$ linear aliphatic diamine when b1) is a $C_{10}$ to $C_{12}$ linear aliphatic diamine and with b23) being a $C_{10}$ to $C_{18}$ diamine when said diamine b1) is a $C_9$ diamine,
and
c) optionally, an amino acid or, as appropriate, the corresponding $C_6$ to $C_{12}$, preferably $C_6$, $C_{11}$ or $C_{12}$, and more preferentially $C_{11}$, lactam, with c) representing no more than 30 mol % relative to a) or relative to b).

Said die (3), in addition to its role of preforming said composite material, also has the role of compacting the composite material passing through said die (3) by eliminating the porosities resulting from the formation of microbubbles of water vapor formed by said polycondensation reaction.

More particularly, said impregnation step is followed by a preforming of said material at the outlet of the impregnation chamber (2) by means of a die (3).

More particularly, said polymerization is carried out in said impregnation chamber (2) optionally with an additional polymerization, referred to as post-polymerization, in said zone (4) separate from said impregnation chamber (2) and from said die (3).

Advantageously, said polymerization is carried out in said impregnation chamber (2).

Advantageously, said polymerization is carried out in said impregnation chamber (2) with an additional polymerization, referred to as post-polymerization, in said zone (4) separate from said impregnation chamber (2) and from said die (3).

According to one particular option of said process before step i) and step ii) there is a step of preheating, in a dedicated zone (1), said fibers before entry into said impregnation chamber (2).

The polymerization temperature lies above the melting temperature Tm of the thermoplastic matrix polyamide and preferably at least 10° C. higher.

The degree of polymerization at the outlet of the die (3) may be identical to that of the targeted final polyamide for said thermoplastic matrix. In this case, there is no need for the additional polymerization referred to as "post-polymerization".

According to another possibility, the degree of polymerization at the outlet of said die (3) may be lower than that of the targeted final polyamide for said thermoplastic matrix and, in this case, said process comprises an additional step of post-polymerization in a dedicated zone (4) separate from said die (3). It is also possible for the polymerization to take place only in said separate dedicated zone (4). Said dedicated zone (4) separate from said die (3) may be a furnace, optionally a vacuum furnace and optionally there may be an additional step of shaping said composite material at the outlet of said furnace (4).

According to another preferred option, said heated impregnation chamber (2) has a(n) (increasing) temperature gradient between the inlet and the outlet of said impregnation chamber (2). This gradient may be adapted on the basis of the targeted degree of polymerization at the outlet of the die (3) and of the kinetics of the reaction.

According to one particular option, the diamine b1) is 1,10-decamethylenediamine and the diamine b2) is chosen from MPMD or mXD with a) being terephthalic acid.

Preferably, said polyamide comprises b1), b2) and c) and, in this case, the molar ratio, in %, of c/(b1+b2) which means that c/b ranges from 5 to 30% and preferably from 10 to 30%.

More preferentially, said polyamide comprises (in its unit structure) the component c) which is chosen from 11-aminoundecanoic acid or 12-aminolauric acid or lauryl lactam.

More preferably still, said polyamide of said thermoplastic matrix has, as components, (like said prepolymers A1, A2 and B have): a) terephthalic acid, b1) 1,10-decamethylenediamine, b2) 1,6-hexamethylenediamine or MPMD or mXD and c) 11-aminoundecanoic acid or 12-aminolauric acid or lauryl lactam.

More particularly, said polyamide (matrix like prepolymers A1, A2 and B) has, as components, a) terephthalic acid, b1) 1,10-decamethylenediamine, b2) 1,6-hexamethylenediamine or MPMD or mXD and c) 11-aminoundecanoic acid.

More particularly still, said polyamide (matrix like prepolymers A1, A2 and B) has, as components, a) terephthalic acid, b1) 1,10-decamethylenediamine, b2) 1,6-hexamethylenediamine and c) 11-aminoundecanoic acid.

According to another particularly preferred option, said polyamide has, as components: a) terephthalic acid, b1) 1,10-decamethylenediamine, b2) 1,6-hexamethylenediamine and c) 12-aminoundecanoic acid.

In the preferred case where said component c) is present, said reactive compositions of prepolymers (A1+A2, B or A1+A2+B) according to the invention enable a lower melt viscosity relative to the same compositions without c), at comparable molecular mass. This allows a significant improvement in the impregnation of said fibrous reinforcement. Alternatively, at constant melt viscosity, the presence of c) makes it possible to have higher prepolymer molecular masses, which amounts to a lower concentration of reactive functions X, Y by polycondensation and thus a lower concentration of water of condensation to be eliminated, with facilitation of its elimination (water of condensation) and ultimately a better progression of the polycondensation (higher final molecular mass of the matrix polyamide) and with fewer defects (microbubbles) in the final composite material linked to this water of condensation.

More particularly, the molar ratio of b1/(b1+b2) ranges from 55 to 75% and the molar ratio of b2/(b1+b2) ranges from 25 to 45%.

According to one particular variant, said reactive precursor composition comprises at least one nanofiller of carbon origin chosen from: carbon black, graphenes, carbon nanofibrils and carbon nanotubes, said nanofiller being added in a form which is predispersed in at least one constituent a), b) or c) that is the most fluid.

The process of the invention relates in particular and preferably to pultrusion and more particularly it is a pultrusion with said fibers being continuously pultruded. More particularly said fibers pultruded by appropriate pulling means pass firstly through a preheating zone (1) before the impregnation chamber (2) where the reactive precursor composition is continuously deposited in the molten state with in situ partial or complete polymerization and, at the outlet, preforming of the thus polymerized impregnated fibrous material by the die (3) with optional post-polymerization in a separate zone (4) in order to complete said polymerization, before cooling of said material which may take place in the ambient air or by controlled cooling means (controlled cooling rate). The material thus obtained may then be converted by heat stamping or by overmolding of another compatible thermoplastic polymer.

According to one particular and preferred option, said precursor composition, as defined above, may comprise, in addition to said prepolymers, an additive which absorbs the radiation from a UV laser at a specific wavelength or from IR heating or from microwave heating or from induction heating for the purposes of reheating said composite, in particular which is pultruded, before a conversion operation, complementary in particular to the pultrusion, either by heat stamping or by overmolding.

Regarding said fibers of said fibrous reinforcement, they are long fibers with an L/D>1000, preferably >2000 (L being the length and D the diameter of said fibers). Preferably, said fibers are selected from mineral fibers, preferably glass, carbon or basalt fibers, in particular glass or carbon fibers, or from synthetics, preferably aramid fibers or polyaryletherketone fibers. Said fibers may represent proportions of from 45 to 75% by volume of said composite material, preferably from 60 to 70%.

More particularly, the process of the invention relates to the manufacture of a structural part based on said composite material. More particularly still, said part is a part in the field of road, rail, sea, aeronautical or aerospace transport or in mechanical construction or in the building industry or in parks and leisure or for producing a reinforcement for shields or panels for protection against the impact of projectiles. In particular, said structural part may be a motor vehicle part, optionally inserted into a metal structure such as the body in white of a vehicle, optionally subjected (with said inserted composite part) to a cycle of thermochemical treatment by cataphoresis. This means that said composite parts for this use must withstand the conditions of treatment by cataphoresis. In particular, a high Tm of said part enables such a treatment.

More particularly, the difference Tm−Tc between the melting point Tm and the crystallization temperature Tc of said matrix (polyamide) polymer does not exceed 60° C., preferably does not exceed 50° C. and more particularly does not exceed 40° C.

According to a specific option, the enthalpy of crystallization of said matrix polymer, measured by differential scanning calorimetry (DSC) according to the standard ISO 11357-3:2013, is greater than 40 J/g, preferably greater than 45 J/g.

Said prepolymers A1, A2 and B, as defined above, have a number-average molecular mass Mn ranging from 500 to 10 000, preferably from 750 to 6000, more preferentially from 750 to 3000. All the masses Mn are determined by calculation on the basis of the content of the end functions, determined by potentiometric titration in solution, and the functionality of said prepolymers. Said polyamide prepolymers may be prepared according to the methods as described in the examples of reactive prepolymers in WO 2014/064375.

Regarding the various parameters defined according to the invention, they are determined as explained in succession below.

The melt viscosity of the prepolymer or of the precursor composition is measured according to the reference manual of the constructor of the measurement device used, which is a Physica MCR301 rheometer, under nitrogen flushing at the given temperature under a shear of $100\ s^{-1}$, between two parallel plates with a diameter of 50 mm.

The Mn of the thermoplastic polymer or prepolymer is determined from the titration (assaying) of the end functions according to a potentiometric method (direct assaying for $NH_2$ or carboxyl) and from the theoretical functionality, which is 2 (as end functions) for linear polymers and prepolymers prepared from bifunctional monomers alone.

Measurement of the intrinsic or inherent viscosity is performed in m-cresol. The method is well known to a person skilled in the art. The standard ISO 307:2007 is followed but with the solvent being changed (use of m-cresol instead of sulfuric acid and the temperature being 20° C.).

The glass transition temperature Tg of the thermoplastic polymers used is measured using a differential scanning calorimeter (DSC), after a second heating pass, according to the standard ISO 11357-2:2013. The heating and cooling rate is 20° C./min.

The melting temperature Tm and the crystallization temperature Tc are measured by DSC, after a first heating, according to the standard ISO 11357-3:2013. The heating and cooling rate is 20° C./min.

The enthalpy of crystallization of said matrix polymer is measured by differential scanning calorimetry (DSC) according to the standard ISO 11357-3:2013.

The second subject of the invention covers said reactive precursor composition based on polyamide prepolymer, for the implementation of the process as described above according to the present invention, composition as already defined above. It corresponds to the mixture A: (A1+A2), to the mixture (A+B) or to the prepolymer B as already defined above. Preferably, said reactive precursor composition comprises at least one nanofiller of carbon origin chosen from: carbon black, graphenes, carbon nanofibrils and carbon nanotubes, said nanofiller being added in a form which is predispersed in at least one constituent a), b) or c) that is the most fluid.

Another subject of the invention relates to a composite material obtained by a process as defined above according to the invention or by using a, precursor composition as defined above according to the invention.

Finally, the invention covers a composite article obtained from a composite material manufactured according to the process as defined above according to the invention. More particularly, said article is a structural part in the motor vehicle field, in the field of road, rail, sea, aeronautical or aerospace transport or in mechanical construction or in the building industry or in parks and leisure or for reinforcements for shields or panels for protection against the impact of projectiles.

FIG. 1 presents the morphology obtained by scanning electron microscopy, after cutting the sample in the transverse direction of the fibers and preparing the sample by ion polishing, after pultrusion at 1 m/min of a thermoplastic polymer of 41/59 mol % MPMD.T/10.T composition with an inherent viscosity of 0.99, introduced into the die using an extruder as described in counterexample 1.

Figure 2:
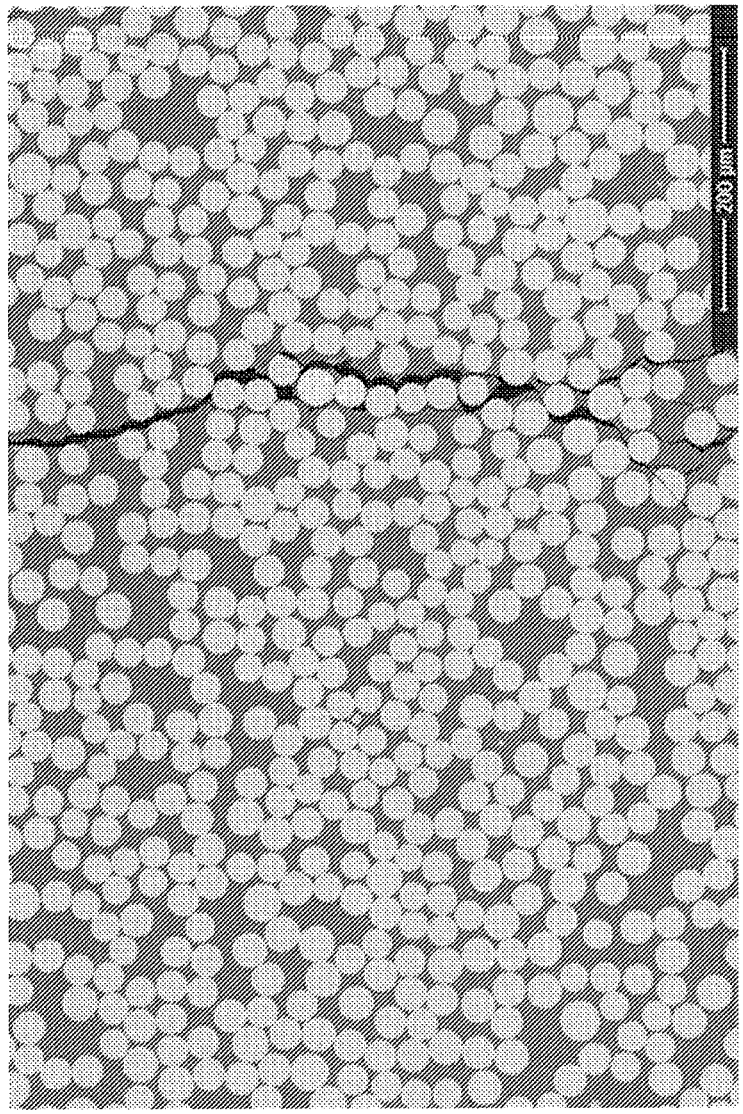
FIG. 2 is a scanning electron micrograph showing the morphology of a composite made in accordance with an exemplary embodiment of the invention.

FIG. 2 presents the morphology obtained by scanning electron microscopy, after cutting the sample in the transverse direction of the fibers and preparing the sample by ion polishing, after pultrusion at 0.3 m/min of a polymer prepared with two 41/59 mol % MPMD.T/10.T prepolymers: a diacid with a viscosity of 0.37 and a diamine with a viscosity of 0.49, melted separately in an extruder and mixed using a static mixer before being introduced into the die as described in example 1.

Figure 3:
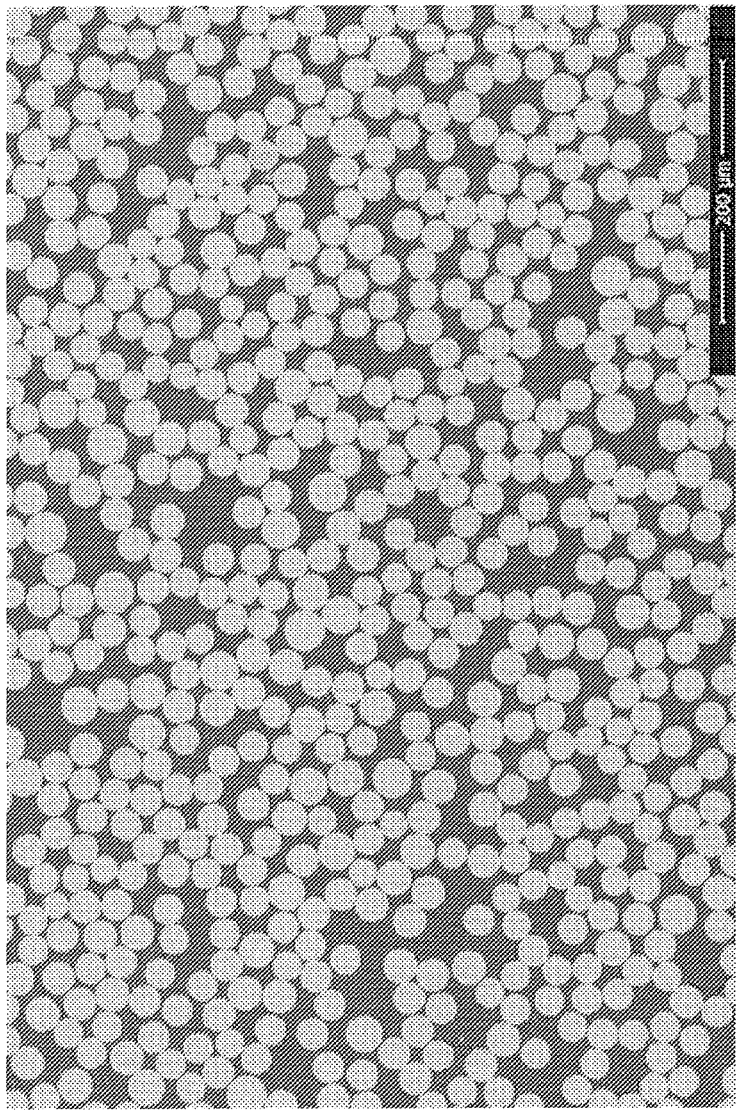
FIG. 3 is a scanning electron micrograph showing the morphology of a composite made in accordance with another exemplary embodiment of the invention.

FIG. 3 presents the morphology obtained by scanning electron microscopy, after cutting the sample in the transverse direction of the fibers and preparing the sample by ion polishing, after pultrusion at 1 m/min of a polymer prepared with two 41/59 mol % MPMD.T/10.T prepolymers: a diacid with a viscosity of 0.37 and a diamine with a viscosity of 0.49, melted separately in an extruder and mixed using a static mixer before being introduced into the die as described in example 3.

EXAMPLES

The various polymers from the examples and from the counterexample are prepared according to the processes as described in international application WO 2014/064375.

The inherent viscosity of the polymers is determined according to ISO 307: 2007, at a concentration of 0.5 wt %, and a temperature of 20° C. using m-cresol.

The morphology images are obtained by scanning electron microscopy, after cutting the sample in the transverse direction of the fibers and preparing the sample by ion polishing.

The tensile mechanical properties of the pultruded sheets are obtained by carrying out tests in the direction of the fibers according to ISO 527-4 (1997) on 250 mm×15 mm bars cut using a diamond cutter.

Counterexample 1

A pultrusion test was carried out at 1 m/min using a conical pultrusion die with a length of 30 cm, as described in the article "Thermoplastic pultrusion process: modeling and optimal conditions for fibers impregnation", Journal of Reinforced Plastics and Composites, 32, 1285-1294 (2013), and a thermoplastic polymer of 41/59 mol % MPMD.T/10.T composition with an inherent viscosity of 0.99, introduced into the die using an extruder.

The fiber content is 60% by volume. The morphology has very many porosities, as confirmed by the image obtained by scanning electron microscopy presented in FIG. 1.

The tensile strength obtained is 786 MPa.

Example 1

A similar test was carried out, at 0.3 m/min, this time using two 41/59 mol % MPMD.T/10.T prepolymers: a diacid with a viscosity of 0.37 and a diamine with the viscosity of 0.49, melted separately in an extruder and mixed using a static mixer before being introduced into the die. The fiber content is 60% by volume.

The state of impregnation of the fibers is much better, as confirmed by the image obtained by scanning electron microscopy presented in FIG. 2, with an absence of porosity. On the other hand, some cracks can be observed, probably due to an insufficient molar mass of the product in the die.

The tensile strength obtained is 1098 MPa.

Example 2

A test similar to example 1 was carried out using infrared furnaces after the pultrusion die to bring the polymer to a temperature of around 300° C. in order to carry out a post-polymerization to improve the mechanical properties. The fiber content is 60% by volume.

The state of impregnation of the fibers is excellent, and no cracks are detected.

The tensile strength obtained is 1391 MPa.

Example 3

A test similar to example 1 was carried out, but the speed was increased to 1 m/min, and using infrared furnaces after the pultrusion die to bring the polymer to a temperature of around 300° C.

The state of impregnation of the fibers is excellent, and no cracks are detected, as shown by FIG. 3.

The tensile strength obtained is 1372 MPa.

The invention claimed is:
1. A process for manufacturing a thermoplastic composite material in an open mold, wherein the material comprises reinforcing fibers and a polyamide thermoplastic matrix impregnating said reinforcing fibers, wherein said matrix is a semicrystalline polyamide with a glass transition temperature Tg of at least 80° C. and with a melting temperature Tm less than or equal to 280° C. and greater than 200° C.;

wherein the matrix is prepared in situ by bulk melt polycondensation polymerization of a reactive precursor composition comprising according to A at least one first polyamide prepolymer A1 bearing two identical functions X (X and X) or Y (Y and Y) and at least one second polyamide prepolymer A2 bearing two identical functions X (X and X) or Y (Y and Y), different from those of A1 and coreactive with respect to those of A1, or of a precursor composition comprising according to B at least one prepolymer bearing (on the same chain) two different functions X and Y coreactive with one another, or of a precursor composition according to a mixture of (A+B), with said functions X and Y being respectively carboxy (X) and amine (Y) and vice versa (Y and X), said glass transition temperatures Tg and melting temperatures Tm being measured using a differential scanning calorimeter (DSC), after a second heating pass, according to the ISO 11357-2:2013 and 11357-3: 2013 standards respectively, with a heating and cooling rate of 20° C./min, wherein the process comprises the following successive steps:
  i) preparation of the reactive mixture A: (A1+A2) or of the reactive mixture (A+B): (A1+A2+B) by melt blending the components or melting said prepolymer B if it is the only component of said reactive precursor composition, at a temperature greater than that of the melting temperature Tm of the mixture A or of the mixture (A+B) or of the Tm of said prepolymer B if it is the only component of said precursor composition,
  ii) continuous impregnation of said fibers with said reactive precursor composition, which is, as appropriate, the mixture A or (A+B) or said prepolymer B, in the molten state, wherein the precursor composition has a viscosity of <100 Pas, under the impregnation conditions, in an open heated impregnation chamber, said impregnation being followed by a preforming at the outlet of the impregnation chamber by means of a die, wherein the melt viscosity is determined with a Physica MCR301 rheometer, under nitrogen flushing at the given temperature under a shear of 100 s.sup.-1, between two parallel plates with a diameter of 50 mm,
  iii) in situ bulk melt polycondensation polymerization in at least one of said impregnation chamber or outside of said impregnation chamber, in a dedicated zone separate from said impregnation chamber and from the die for preforming said material and with said dedicated zone located after the impregnation chamber and said die and with a time and polymerization temperature controlled such that the polymerization temperature is greater than the melting temperature Tm of said thermoplastic matrix polyamide,
  iv) cooling of said thermoplastic composite material, and wherein the thermoplastic polyamide matrix and said prepolymers A1, A2 or B have the same amide unit composition and wherein said amide units are derived from:
    a) a diacid component which is 95 to 100 mol %, of terephthalic structure, with the presence of 0 to 5 mol % of the isophthalic diacid,
    b) a diamine component composed of:
      b1) from 55 to 85 mol % of a $C_9, C_{10}, C_{11}, C_{12}$ aliphatic linear diamine, and
      b2) from 15 to 45 mol % of a diamine different from b1), selected from the group consisting of:
        b21) a mono-branched aliphatic diamine with methyl or ethyl substituent and having a difference in chain length relative to the associated diamine b1) of at least two carbons,
        b22) m-xylylenediamine (mXD), and
        b23) a $C_4$ to $C_{18}$ linear aliphatic diamine when b1) is a $C_{10}$ to $C_{12}$ linear aliphatic diamine and with b23) being a $C_{10}$ to $C_{18}$ diamine when said diamine b1 is a $C_9$ diamine; and
    c) optionally, an amino acid or, the corresponding $C_6$ to $C_{12}$ lactam, with c) representing no more than 30 mol % relative to a) or relative to b).

2. The process according to claim 1, wherein said polymerization is carried out in said impregnation chamber.

3. The process according to claim 1, wherein said polymerization is carried out in said impregnation chamber with an additional polymerization, referred to as post-polymerization, in said zone separate from said impregnation chamber and from said die.

4. The process according to claim 1, wherein before step i) and step ii) there is a step of preheating, in a dedicated zone, said fibers before entry into said impregnation chamber.

5. The process according to claim 1, wherein the degree of polymerization at the outlet of the die is identical to that of the targeted final polyamide for said thermoplastic matrix.

6. The process according to claim 1, wherein the degree of polymerization at the outlet of said die remains lower than that of the targeted final polyamide for said thermoplastic matrix and that in this case, said process comprises an additional step of post-polymerization in a dedicated zone separate from and located after said die.

7. The process according to claim 6, wherein the dedicated zone separate from and located after said die is a furnace, and optionally there is an additional step of shaping said composite material at the outlet of said furnace.

8. The process according to claim 1, wherein said heated impregnation chamber has a temperature gradient between the inlet and the outlet of said impregnation chamber.

9. The process according to claim 1, wherein said polyamide comprises b1), b2) and c) and the molar ratio, in %, of c/(b1+b2) ranges from 5 to 30%.

10. The process according to claim 1, wherein said polyamide comprises c) chosen from 11-aminoundecanoic acid or 12-aminolauric acid or lauryl lactam.

11. The process according to claim 1, wherein said polyamide has, as components, a) terephthalic acid, b1) 1,10-decamethylenediamine, b2) 1,6-hexamethylenediamine or 2-methylpentamethylenediamine (MPMD) or mXD and c) 11-aminoundecanoic acid or 12-aminolauric acid or lauryl lactam.

12. The process according to claim 1, wherein said polyamide has, as components, a) terephthalic acid, b1) 1,10-decamethylenediamine, b2) 1,6-hexamethylenediamine and c) 11-aminoundecanoic acid.

13. The process according to claim 1, wherein said polyamide has, as components, a) terephthalic acid, b1) 1,10-decamethylenediamine, b2) 1,6-hexamethylenediamine and c) 12-aminoundecanoic acid.

14. The process according to claim 1, wherein b1) is 1,10 decamethylenediamine and b2) is chosen from MPMD or mXD and a) is terephthalic acid.

15. The process according to claim 1, wherein the molar ratio of b1/(b1+b2) ranges from 55 to 75% and that the molar ratio of b2/(b1+b2) ranges from 25 to 45%.

16. The process according to claim 1, wherein said reactive precursor composition comprises at least one nanofiller of carbon origin selected from the group consisting of: carbon black, graphenes, carbon nanofibrils and carbon nanotubes, said nanofiller being added in a form which is predispersed in at least one constituent a), b) or c) that is the most fluid.

17. The process according to claim 1, wherein the process is pultrusion with said reinforcing fibers being continuously pultruded.

18. The process according to claim 1, wherein said precursor composition comprises, in addition to said prepolymers, an additive which absorbs a radiation from a UV laser at a specific wavelength or from IR heating or from microwave heating or from induction heating for the purposes of reheating said thermoplastic matrix composite, before a conversion operation, wherein the conversion operation comprises heat stamping overmolding.

19. The process according to claim 1, wherein said reinforcing fibers are long fibers with an L/D>1000.

20. The process according to claim 1, wherein said reinforcing fibers are selected from the group consisting of mineral fibers, glass fibers, carbon fibers, basalt fibers, synthetic fibers, aramid fibers, and polyaryletherketone fibers.

21. The process according to claim 1, wherein the process is used for manufacture of a structural part based on said thermoplastic composite material.

22. The process according to claim 21, wherein said structural part is a part in the field of road, rail, sea, aeronautical or aerospace transport or in mechanical construction or in the building industry or in parks and leisure or for producing a reinforcement for shields or panels for protection against the impact of projectiles.

23. The process according to claim 21, wherein said structural part is a motor vehicle part, optionally inserted into a metal structure such as the body in white of a vehicle, optionally subjected to a cycle of thermochemical treatment by cataphoresis.

24. A composite material made using the precursor composition according to claim 1.

25. A composite article, wherein the composite article is obtained from a thermoplastic composite material manufactured by the process as according to claim 1.

26. The article according to claim 25, wherein the article is a structural part in the motor vehicle field, in the field of road, rail, sea, aeronautical or aerospace transport or in mechanical construction or in the building industry or in parks and leisure or for reinforcements for shields or panels for protection against the impact of projectiles.

* * * * *